US012779556B2

(12) United States Patent
Matsumoto et al.

(10) Patent No.: US 12,779,556 B2
(45) Date of Patent: Nov. 3, 2026

(54) CUTTING MACHINE

(71) Applicant: HONDA MOTOR CO., LTD., Tokyo (JP)

(72) Inventors: Shimpei Matsumoto, Tokyo (JP); Keiichiro Oka, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 104 days.

(21) Appl. No.: 18/850,590

(22) PCT Filed: Mar. 30, 2022

(86) PCT No.: PCT/JP2022/016031
§ 371 (c)(1),
(2) Date: Sep. 25, 2024

(87) PCT Pub. No.: WO2023/188118
PCT Pub. Date: Oct. 5, 2023

(65) Prior Publication Data

US 2025/0222529 A1 Jul. 10, 2025

(51) Int. Cl.
*B23B 41/12* (2006.01)
*B23Q 11/00* (2006.01)

(52) U.S. Cl.
CPC ............ *B23B 41/12* (2013.01); *B23Q 11/005* (2013.01); *B23Q 11/0075* (2013.01)

(58) Field of Classification Search
CPC .... B23B 41/12; B23Q 11/005; B23Q 11/0075
See application file for complete search history.

(56) References Cited

U.S. PATENT DOCUMENTS 4,436,460 A * 3/1984 Powell .................... B23B 41/12 409/184
4,701,081 A 10/1987 Hashimoto et al.
(Continued)

FOREIGN PATENT DOCUMENTS

CN 102006955 4/2011
CN 103796795 5/2014
(Continued)

OTHER PUBLICATIONS

International Search Report and Written Opinion for International Application No. PCT/JP2022/016031 mailed on May 17, 2022, 8 pages.

(Continued)

*Primary Examiner* — Eric A. Gates
(74) *Attorney, Agent, or Firm* — Amin, Turocy & Watson, LLP

(57) ABSTRACT

This cutting machine is provided with an air supply mechanism. The air supply mechanism feeds air into the interior of a jig from a support block. The air supply mechanism comprises: an air supply flow passage provided to the support block; an air flow passage provided to the jig; and a switching valve provided to the air flow passage. Before the switching valve is opened during a process of an operation for connecting the jig and the support block, a discharge passage is brought into communication with a space enclosed by a first reference seat of the jig, a connection part of the support block, and the switching valve.

9 Claims, 7 Drawing Sheets

(56) References Cited

U.S. PATENT DOCUMENTS

| | | | | |
|---|---|---|---|---|
| 5,690,137 | A | 11/1997 | Yamada | |
| 6,506,143 | B1 * | 1/2003 | Goto | B23Q 17/09<br>33/603 |
| 8,256,092 | B1 * | 9/2012 | Woodruff | B23B 41/12<br>409/200 |
| 10,578,196 | B2 * | 3/2020 | Haremaki | F16H 57/027 |
| 2006/0258521 | A1 | 11/2006 | Bryan | |
| 2011/0027028 | A1 | 2/2011 | Sadaoka et al. | |
| 2014/0338765 | A1 | 11/2014 | Kono et al. | |

FOREIGN PATENT DOCUMENTS

| | | | | | |
|---|---|---|---|---|---|
| CN | 112170376 | A | * | 1/2021 | F26B 21/50 |
| DE | 102014014417 | A1 | * | 3/2016 | B23Q 11/0075 |
| JP | 54-023276 | | | 2/1979 | |
| JP | 05-002442 | | | 1/1993 | |
| JP | 06-210506 | | | 8/1994 | |
| JP | 06-277920 | | | 10/1994 | |
| JP | 2000-000736 | | | 1/2000 | |
| JP | 2001-009667 | | | 1/2001 | |
| KR | 20090062359 | A | * | 6/2009 | B23Q 11/005 |
| KR | 101194099 | B1 | * | 10/2012 | B08B 5/023 |

OTHER PUBLICATIONS

Chinese Office Action with Search Report for Chinese Patent Application No. 202280094549.4 mailed Sep. 29, 2026.

* cited by examiner

CUTTING MACHINE

TECHNICAL FIELD

The present invention relates to a cutting machine that uses a cutting tool to carry out machining on a workpiece.

BACKGROUND ART

The present applicant has proposed a cutting machine used for boring (refer to JP H05-002442 B2). This cutting machine carries out machining on bearing holes in a cylinder block and a cylinder head, which are workpieces.

The cutting machine includes a support column, a drive mechanism, a feed mechanism, four tool heads, four boring bars, four support jigs, an index mechanism, a workpiece support mechanism, and a transport mechanism.

The support column is erected on a base. A machining station is installed on the base. The drive mechanism is disposed at a position corresponding to the machining station so as to be capable of ascending and descending. The drive mechanism and the tool heads are raised and lowered along the support column by the feed mechanism. The boring bars are connected in an attachable and detachable manner to the respective tool heads. The boring bars extend downwardly from the tool heads. The support jigs are disposed at a position corresponding to the machining station. The support jigs are fixed to a lower part of the support column. The four tool heads, the four boring bars, and the four support jigs are disposed so as to be switchable by the index mechanism.

In this cutting machine, the tool head, the boring bar, and the support jig corresponding to the type of the workpiece are switched and arranged at the position of the machining station by the index mechanism. A workpiece is transported by the transport mechanism to a position corresponding to the machining station, and is retained by the support jig. A motor of the feed mechanism is driven, thereby causing the drive mechanism, the tool heads, and the boring bars to be lowered along the support column. By the drive mechanism being driven, the boring bars are inserted into bearing holes of the workpiece while rotating. Cutting edges of the boring bars carry out machining of the bearing holes of the workpiece. After the machining of the bearing holes of the workpiece is completed, the feed mechanism is driven to thereby raise the boring bars. After the workpiece has been released from the support jig, the workpiece is transported from the machining station by the transport mechanism.

In a series of machining operations by the cutting machine, the cutting edges of the boring bars and the machined portion of the workpiece generate heat. Therefore, when cutting machining is carried out on a workpiece by a cutting machine, the cutting edges are generally cooled by applying a coolant to the cutting edges in order to suppress a decrease in the strength of the cutting edges due to heat generation or a decrease in machining accuracy due to deformation of a machined surface.

Further, by applying the coolant to the machined portion of the workpiece, removal of chips generated by cutting machining of the workpiece and cooling of the machined portion are simultaneously performed by the coolant. The coolant also has a function of cleaning chips generated by the cutting machining so that the chips do not adhere to the cutting edges or the machined surface of the workpiece.

SUMMARY OF THE INVENTION

However, when cutting machining is carried out on the workpiece by the cutting machine, there is a concern that the chips swept away by the coolant enter a gap of a rotation mechanism of each boring bar and hinder rotation of the boring bar. Therefore, it is necessary to suppress the entry of the chips or the entry of the coolant containing the chips into the bearing portion that rotatably retains the boring bar.

Further, when the bearing portion rotates together with the boring bar, the bearing portion itself also generates heat due to friction. Therefore, in order to stably perform smooth rotation and support of the boring bar, a cooling unit is required also for the bearing portion to which the coolant cannot be applied. For example, a cooling unit capable of cooling the bearing portion by supplying air thereto is conceivable. However, when four tool heads or support jigs are separated and connected to automatically switch the tool heads or the support jigs according to the workpiece or the machined portion of the workpiece, the coolant or the chips may be caught therebetween, and thus there is concern that the connection of the tool heads or the support jigs may be incomplete or the chips or the coolant may enter an air passage for supplying air.

The present invention has the object of solving the aforementioned problem.

An aspect of the present invention is characterized by a cutting machine comprising: a machine main body including a drive mechanism configured to rotationally drive a tool that is configured to perform cutting machining on a workpiece; and a jig configured to be attachable to and detachable from the machine main body and configured to retain the workpiece, wherein the machine main body includes: a main body frame on which the drive mechanism is disposed; a support block that is configured to support the jig in an attachable and detachable manner, includes a connecting portion to be connected to a connected portion of the jig, and is disposed on the main body frame; and an air supply mechanism configured to supply air from the support block to an interior of the jig, the air supply mechanism includes: a first air flow path that is disposed in the support block, opens at the connecting portion, and is supplied with air from an air supply source; a second air flow path that is disposed in the jig and opens at the connected portion; and a switching valve disposed in the second air flow path, the switching valve being disposed in the jig and configured to, when the connecting portion and the connected portion are connected to each other, allow the first air flow path and the second air flow path to communicate with each other by being pressed by the connecting portion and thereby opened, a discharge passage is disposed in at least one of the connecting portion or the connected portion, and before the switching valve is opened in a process of an operation of connecting the connected portion and the connecting portion, the discharge passage communicates with a space surrounded by the connected portion, the connecting portion, and the switching valve.

According to the present invention, the following effects can be obtained.

That is, when the connecting portion of the support block and the connected portion of the jig are connected, the switching valve is pushed by the connecting portion and opened, whereby air can be supplied from the first air flow path of the support block to the second air flow path of the jig. Before the switching valve is opened in the process of the operation of connecting the connected portion and the connecting portion, the space surrounded by the connected portion, the connecting portion, and the switching valve communicates with the discharge passage. At this time, since the switching valve is not disposed in the connecting portion, air is supplied from the first air flow path to the space surrounded by the connected portion, the connecting portion, and the switching valve.

As a result, when the liquid enters the first air flow path or when the liquid is retained in the vicinity of the contact portion between the connected portion and the connecting portion, the liquid can be pushed out by the air supplied to the first air flow path and can be reliably discharged from the discharge passage to the exterior. Therefore, the liquid in the first air flow path can be reliably prevented from entering the second air flow path of the jig.

DETAILED DESCRIPTION OF THE INVENTION

Figure 1:
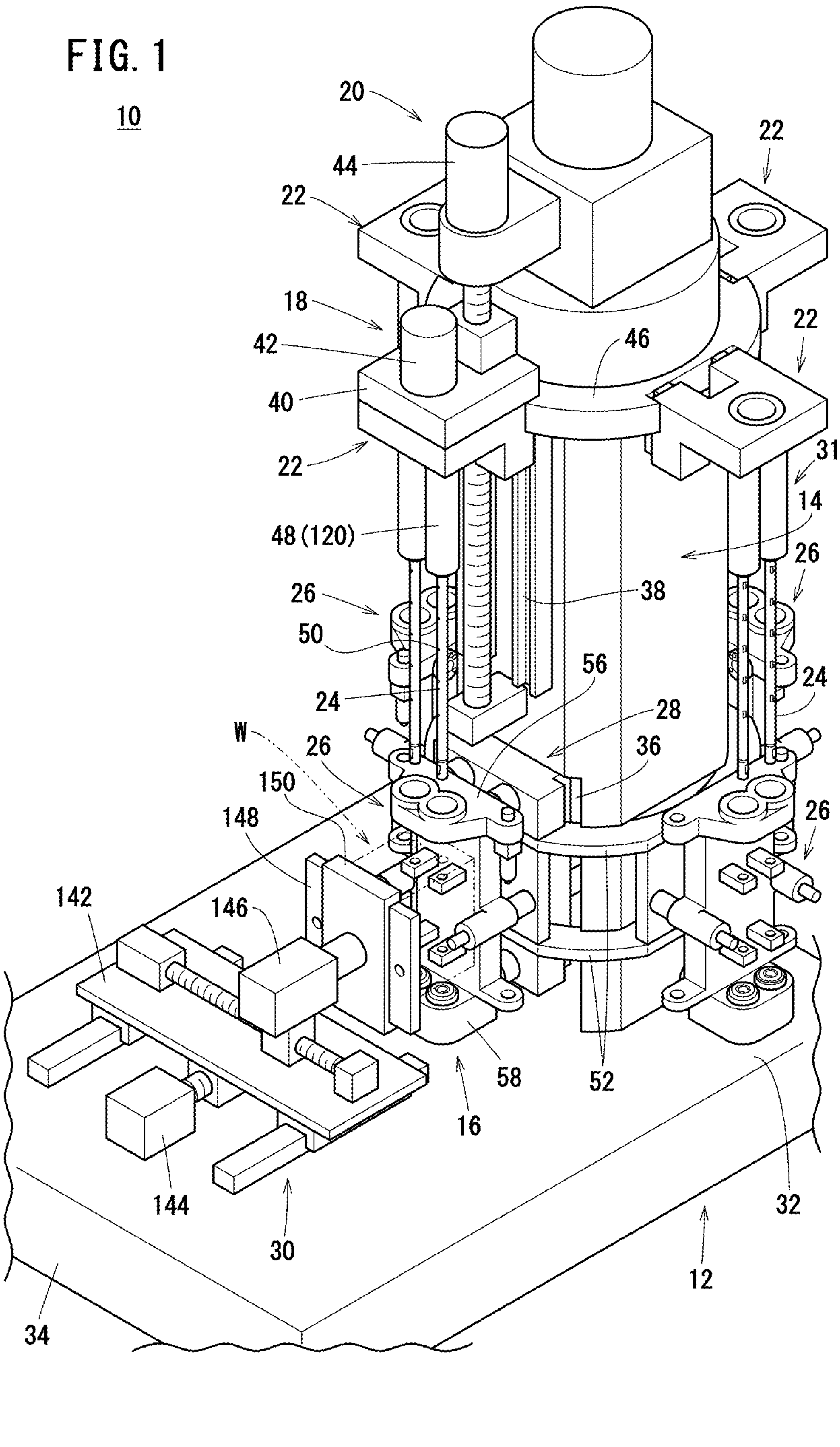
FIG. 1 is an external perspective view of a cutting machine according to an embodiment of the present invention.
Figure 2:
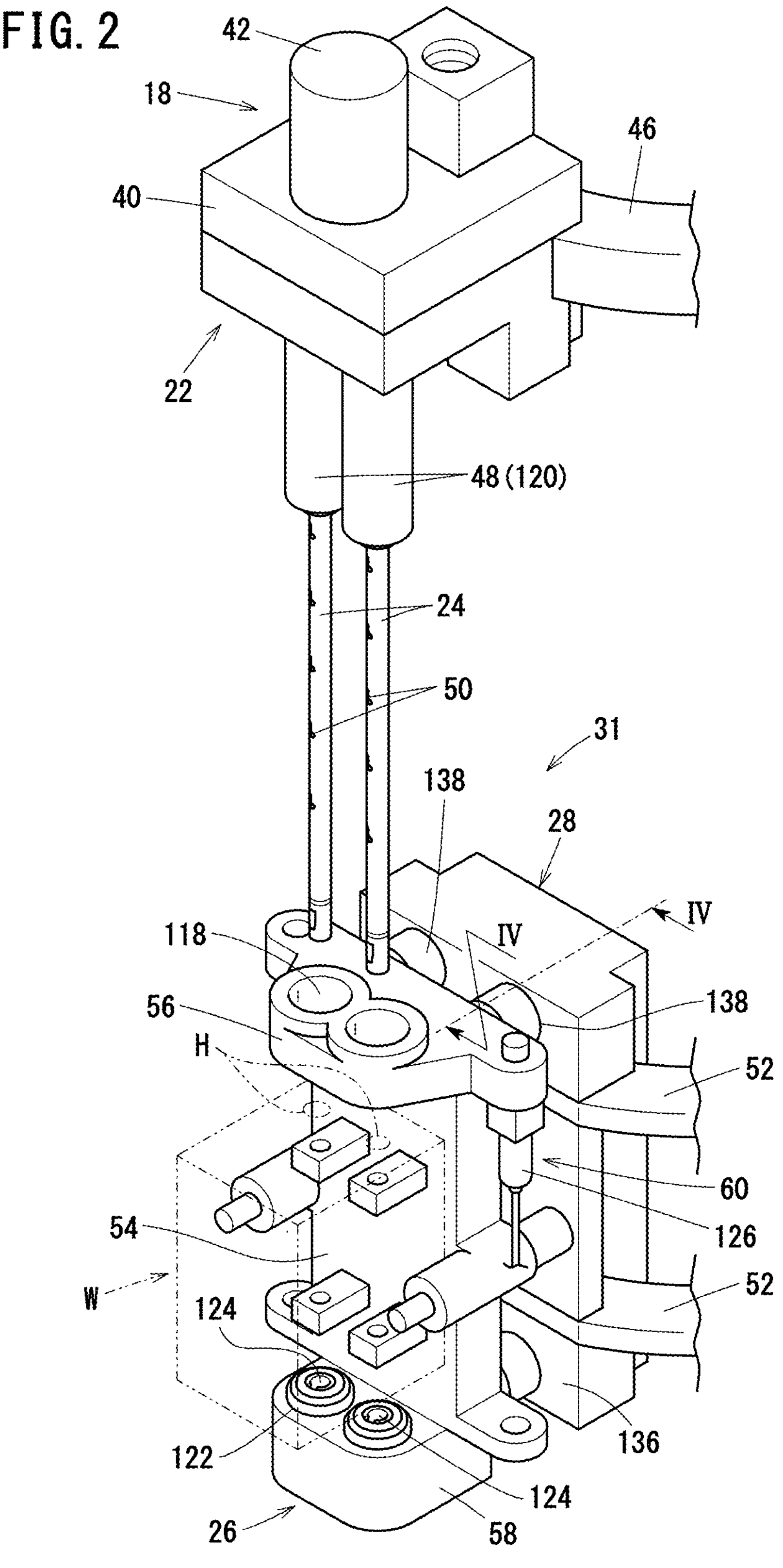
FIG. 2 is an enlarged perspective view of essential portions of the cutting machine shown in FIG. 1.

A cutting machine 10 is used in order to carry out machining of holes in a workpiece W. The workpiece W is a cylinder block or a cylinder head of an internal combustion engine that is mounted in a vehicle. As shown in FIG. 1 and FIG. 2, the cutting machine 10 includes a foundation 12, a main body frame 14, a machining station 16, a drive mechanism 18, a feed mechanism 20, four tool heads 22, tools 24, jigs 26, a support block 28, and a transport mechanism 30. A machine main body 31 is constituted by the foundation 12, the main body frame 14, the machining station 16, the drive mechanism 18, the feed mechanism 20, the tool heads 22, the tools 24, the support block 28, and the transport mechanism 30.

The foundation 12 is disposed in a lower part of the cutting machine 10. The foundation 12 extends in the horizontal direction. The foundation 12 is placed on a floor surface or the like. The foundation 12 includes a first base 32 and a second base 34. The main body frame 14 is connected to an upper part of the first base 32. The second base 34 is adjacent to the first base 32. The transport mechanism 30, which will be described later, is disposed on an upper part of the second base 34.

The main body frame 14 stands upwardly from the upper part of the first base 32 of the foundation 12. The cross-sectional shape of the main body frame 14 is substantially circular when viewed in the upper/lower direction. The main body frame 14 includes an accommodation space 36 and a guide rail 38.

The accommodation space 36 opens on the outer circumferential surface of the main body frame 14. The accommodation space 36 faces the machining station 16 and the transport mechanism 30, which will be described later. The accommodation space 36 has a rectangular shape elongated in the axial direction of the main body frame 14. The support block 28, which will be described later, is accommodated in the accommodation space 36.

The guide rail 38 is disposed on the outer circumferential surface of the main body frame 14. The guide rail 38 is disposed on an upper part of the accommodation space 36. The guide rail 38 extends along the axial direction of the main body frame 14.

The machining station 16 is a site where the workpiece W is subjected to machining. The machining station 16 is disposed on a lateral side of the main body frame 14. The machining station 16 faces a lower part of the main body frame 14. The machining station 16 is disposed between the main body frame 14 and the transport mechanism 30. The workpiece W is transported in and transported out of the machining station 16 by the transport mechanism 30.

The drive mechanism 18 is disposed on an upper part of the main body frame 14. A portion of the drive mechanism 18 projects radially outward from the main body frame 14. The drive mechanism 18 is disposed above the machining station 16. The drive mechanism 18 and the machining station 16 face each other in the upper/lower direction. The drive mechanism 18 includes a lifting platform 40 and a drive motor 42.

The lifting platform 40 is disposed horizontally and orthogonally to the axial line of the main body frame 14. The lifting platform 40 is capable of moving along the guide rail 38 of the main body frame 14. The drive motor 42 is fixed to an upper part of the lifting platform 40. The drive motor 42 includes drive shafts (not shown). The drive shafts penetrate through the lifting platform 40 and extend downward. Rotating shafts 48 of the tool heads 22 are connected to lower ends of the drive shafts. By electrical power being applied to the drive motor 42 from a non-illustrated electrical power source, the rotating shafts 48 rotate together with the drive shafts.

The feed mechanism 20 is capable of moving the drive mechanism 18 including the lifting platform 40 up and down in the upper/lower direction. The feed mechanism 20 is disposed on the upper part of the main body frame 14. The feed mechanism 20 includes a lifting motor 44. By driving the lifting motor 44, the lifting platform 40 moves up and down in the upper/lower direction along the guide rail 38.

The four tool heads 22 are arranged on the outer circumference of the main body frame 14. The four tool heads 22 are retained on a head carrier 46. The head carrier 46 has an annular shape. The head carrier 46 is disposed radially outward from the outer circumferential surface of the main body frame 14. The head carrier 46 is rotatably disposed on the main body frame 14. The four tool heads 22 are arranged at equal intervals in the circumferential direction of the head carrier 46. When viewed from the axial direction of the head carrier 46, the four tool heads 22 are spaced apart from one another by 90 degrees.

By the head carrier 46 being rotated by the driving force of a non-illustrated drive source, the four tool heads 22 rotate around the main body frame 14. The four tool heads 22 rotate along the outer circumferential surface of the main body frame 14, and one tool head 22 of the four tool heads 22 is disposed at a position that faces the machining station 16.

Each of the tool heads 22 includes the rotating shafts 48. The rotating shafts 48 are rotatably supported on the tool head 22. The rotating shafts 48 extend downward from the tool head 22. Upper ends of the rotating shafts 48 are connected to the lower ends of the drive shafts of the drive motor 42 in the drive mechanism 18. Lower ends of the rotating shafts 48 are connected to upper ends of the tools 24 via non-illustrated joints.

The tools 24 are disposed in an attachable and detachable manner on the tool head 22. The tools 24 are shaft bodies elongated along the axial direction. The tools 24 extend downward from the tool head 22. In the present embodiment, the tools 24 are boring bars. The tools 24 each include a plurality of bits 50 (cutting edges). The bits 50 are shaft bodies having cutting portions at distal ends thereof. The bits 50 are disposed in a direction that is orthogonal to the axial lines of the tools 24.

The bits 50 are inserted into the tools 24. The distal ends of the bits 50 project radially outward from the outer circumferential surfaces of the tools 24. The plurality of bits 50 are arranged at equal intervals along the axial direction of the tools 24. Cutting machining is carried out by the distal ends of the bits 50 on the inner circumferential surfaces of machined holes H (refer to FIG. 2) in the workpiece W.

The upper ends of the tools 24 are capable of being connected to the lower ends of the rotating shafts 48. When the drive motor 42 rotates, the tools 24 rotate along with the rotating shafts 48. Lower ends of the tools 24 can be inserted into second bearings 124 of a second bearing portion 58 of each jig 26, which will be described later.

The four jigs 26 are capable of retaining the workpiece W. The jigs 26 are retained on support carriers 52. The jigs 26 are each positioned at the same height as the support block 28 by a pair of the support carriers 52 in the axial direction of the main body frame 14. The support carriers 52 have an annular shape. The support carriers 52 are rotatably disposed on the outer circumference of the main body frame 14. The four jigs 26 are retained by the support carriers 52 at equal intervals in the circumferential direction of the support carriers 52. When viewed from the axial direction of the support carriers 52, the four jigs 26 are spaced apart from one another by 90 degrees.

The four jigs 26 are capable of rotating around the outer circumference of the main body frame 14 by the support carriers 52. When one jig 26 of the four jigs 26 faces the machining station 16, the one jig 26 faces the support block 28.

Figure 3:
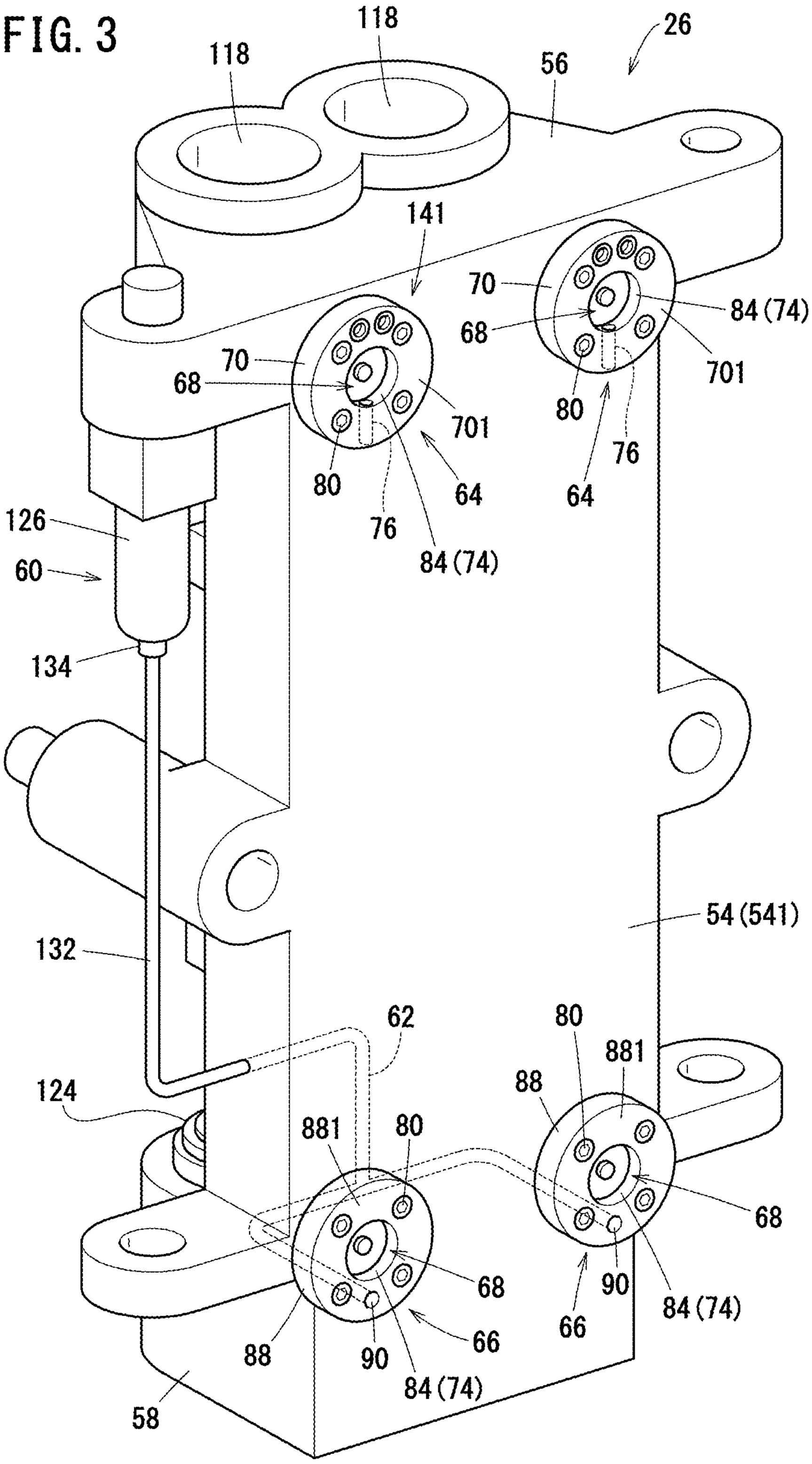
FIG. 3 is an external perspective view of a jig in the cutting machine of FIG. 2 as viewed from direction of a back surface.

As shown in FIG. 1 to FIG. 3, the jigs 26 each include a jig main body 54, first and second bearing portions 56 and 58, and a drain discharge mechanism 60. The cross-sectional shape of the jig 26 is a U-shape in which the first and second bearing portions 56 and 58 and the jig main body 54 are substantially orthogonal to each other. The cross-sectional shape of the jig 26 opens in a direction away from the support carriers 52. The workpiece W is retained in a manner so as to be surrounded by the jig main body 54, and the first and second bearing portions 56 and 58 (refer to FIG. 1 and FIG. 2).

The jig main body 54 has a flat plate shape. The jig main body 54 faces the main body frame 14 or the support block 28. The jig main body 54 has a substantially rectangular shape that is straight in the upper/lower direction. A drain passage 62 is provided inside the jig main body 54. The upstream end of the drain passage 62 is connected to a drain tank 126 of the drain discharge mechanism 60, which will be described later.

Figure 4:
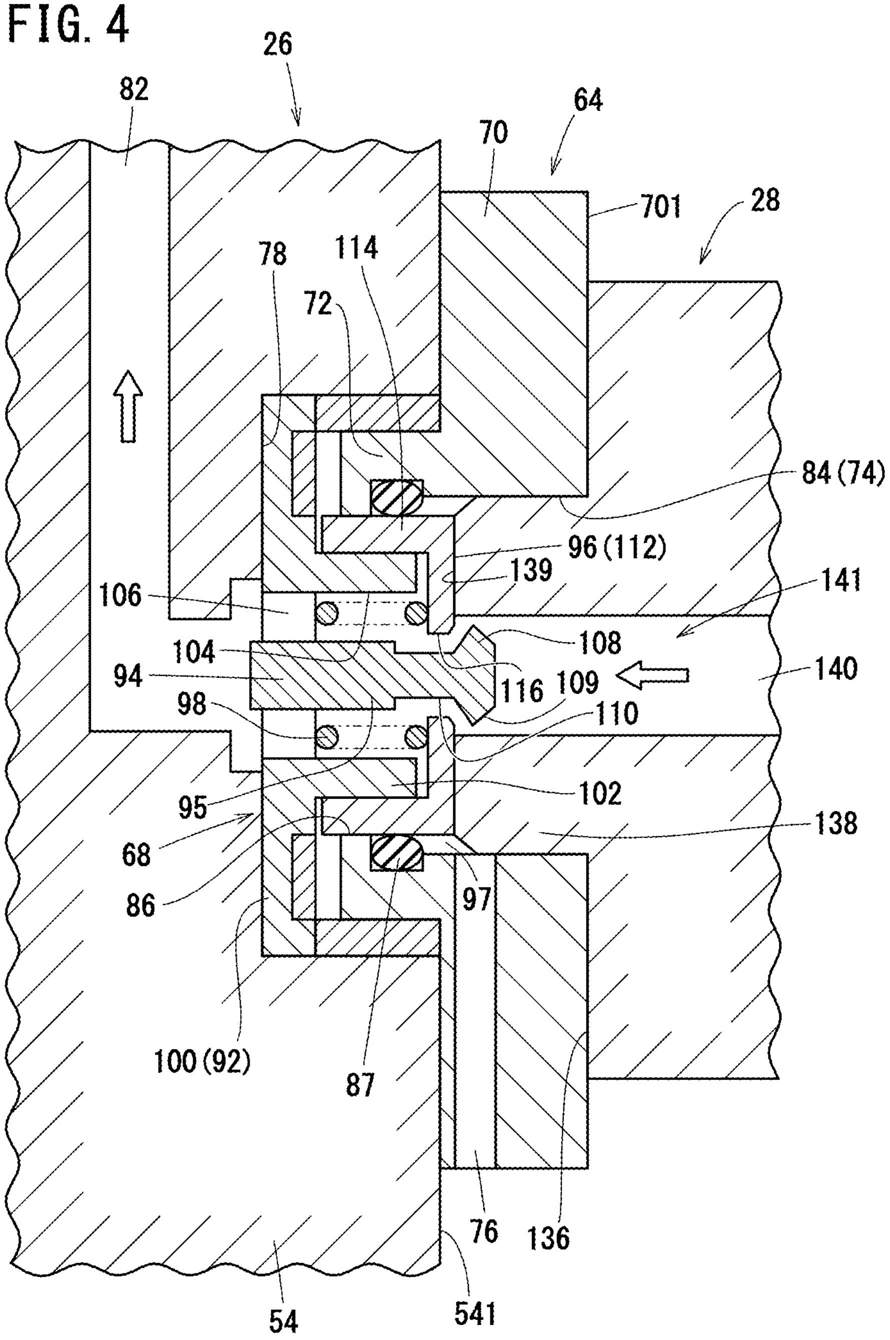
FIG. 4 is a cross-sectional view taken along line IV-IV of FIG. 2.

The jig main body 54 has a back surface 541. The back surface 541 faces the main body frame 14. The back surface 541 of the jig main body 54 is flat along the upper/lower direction and the widthwise direction of the jig main body 54. The back surface 541 of the jig main body 54 includes concave portions 78 (refer to FIG. 4). The concave portions 78 are recessed from the back surface 541. The cross-sectional shape of the concave portions 78 is circular. An air flow path 82 is connected to the bottom part of the concave portions 78. The air flow path 82 extends to the second bearing portion 58, which will be described later, inside the jig main body 54. Air can be supplied to the second bearings 124 of the second bearing portion 58 through the air flow path 82.

A pair of first reference seats (connected portions) 64, a pair of second reference seats (connected portions) 66, and switching valves 68 are attached to the back surface 541 of the jig main body 54. Connecting portions 138 of the support block 28, which will be described later, come into contact with the first and second reference seats 64 and 66.

The pair of first reference seats 64 are attached to the vicinity of the upper end of the jig main body 54. One first reference seat 64 and the other first reference seat 64 are separated in the widthwise direction orthogonal to the upper/lower direction of the jig main body 54.

As shown in FIG. 3 to FIG. 6, the first reference seats 64 each include a first main body portion 70, an insertion portion 72, and a through hole 74. The first main body portion 70 has a disk shape. A back surface 701 of the first main body portion 70 is flat along the upper/lower direction and the widthwise direction of the jig main body 54. The first main body portion 70 has a predetermined thickness in the axial direction of the first reference seat 64. The first main body portion 70 comes into contact with the back surface 541 of the jig main body 54. The first main body portion 70 protrudes from the back surface 541 of the jig main body 54 by the thickness of the first main body portion 70.

The first main body portion 70 includes a discharge passage 76. The discharge passage 76 extends downward from the through hole 74 of the first main body portion 70. The discharge passage 76 opens on an outer edge portion of the first main body portion 70. The through hole 74 and the exterior of the first main body portion 70 communicate with each other through the discharge passage 76. It should be noted that the discharge passage 76 is not limited to the case of extending downward.

The insertion portion 72 has a cylindrical shape. The insertion portion 72 is disposed at the center of the first main body portion 70. When viewed from the axial direction of the first reference seat 64, the cross-sectional shape of the insertion portion 72 is circular. The insertion portion 72 protrudes in a direction away from the back surface 701 of the first main body portion 70. The insertion portion 72 is inserted into the concave portion 78 of the jig main body 54.

The first main body portions 70 come into contact with the back surface 541 of the jig main body 54, and the insertion portions 72 are inserted into the concave portions 78. The first main body portions 70 are fixed to the back surface 541 of the jig main body 54 by bolts 80. Consequently, the first reference seats 64 are mounted on the back surface 541 of the jig main body 54.

The through holes 74 each allow air to flow therethrough. When the jig 26 and the support block 28 are connected to each other, air is supplied to the through hole 74 through the support block 28. The through hole 74 is connected to the air flow path (a second air flow path) 82 of the jig main body 54. The through hole 74 is disposed at the center of the first reference seat 64. The through hole 74 penetrates through the first reference seat 64 along the axial direction. The through hole 74 includes a connection port 84 and a valve accommodation portion 86. The connection port 84 opens on the back surface 701 of the first main body portion 70. The connection port 84 extends from the first main body portion 70 to the insertion portion 72. The connection port 84 has a substantially constant diameter. The connecting portions 138 of the support block 28, which will be described later, can each be inserted into the connection port 84.

The valve accommodation portion 86 is disposed inside the insertion portion 72. The valve accommodation portion 86 opens on an end part of the insertion portion 72. The valve accommodation portion 86 accommodates the switching valve 68. The valve accommodation portion 86 is provided with a sealing ring 87. The sealing ring 87 is retained on the inner circumferential surface of the insertion portion 72. The sealing ring 87 is in sliding contact with a piston 96 of the switching valve 68 described later.

The discharge passage 76 is connected to the connection port 84. The extending direction of the connection port 84 and the extending direction of the discharge passage 76 are substantially orthogonal to each other. The through hole 74 (the connection port 84) and the discharge passage 76 communicate with each other.

Figure 7:
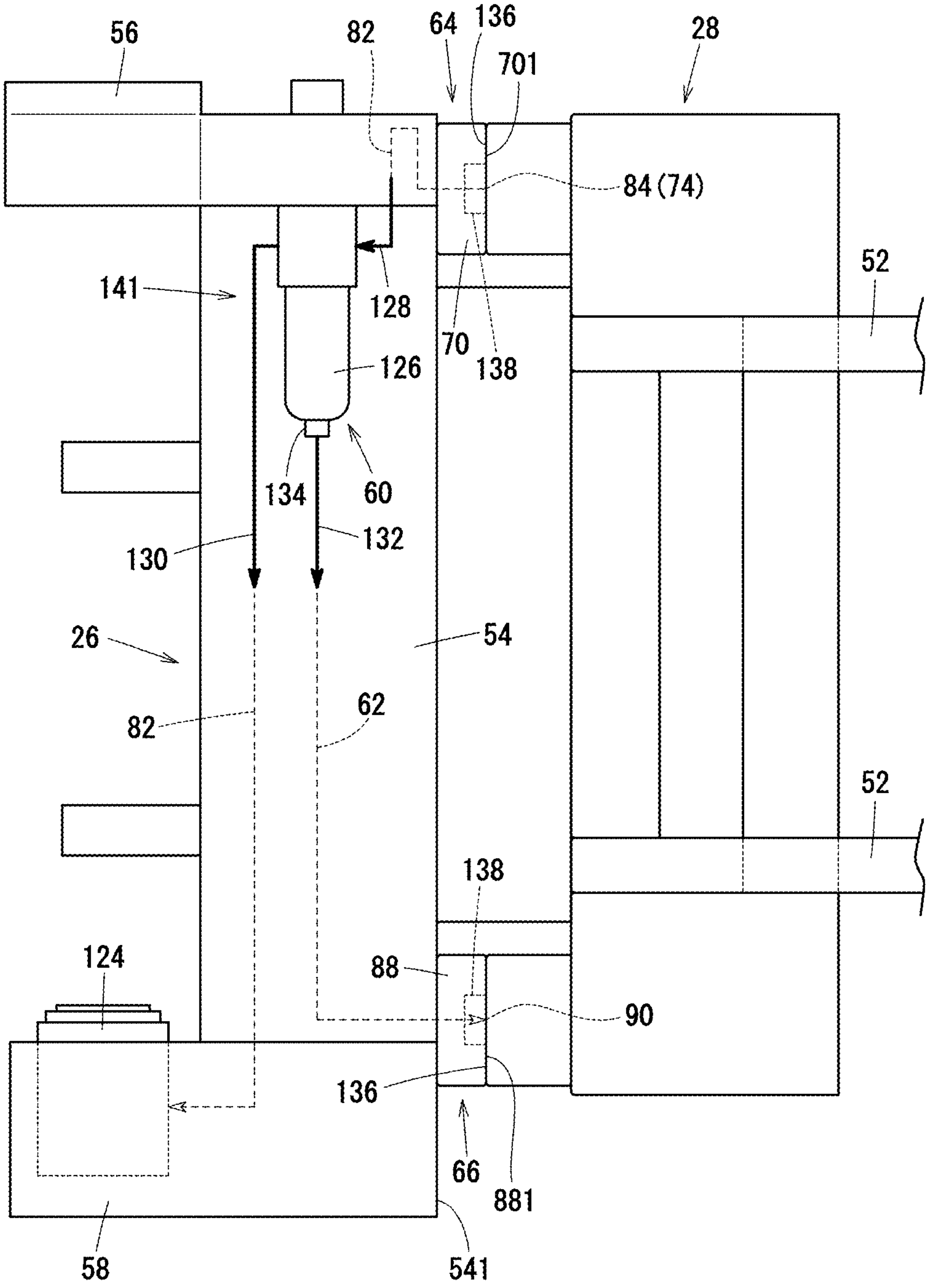
FIG. 7 is a schematic side view of the jig and the support block of the cutting machine shown in FIG. 2.

As shown in FIG. 3 and FIG. 7, the pair of second reference seats 66 are attached to the vicinity of the lower end of the jig main body 54. One second reference seat 66 and the other second reference seat 66 are separated in the widthwise direction orthogonal to the upper/lower direction of the jig main body 54.

The second reference seats 66 each include a second main body portion 88, an insertion portion 72, and a through hole 74. Since the second reference seat 66 has substantially the same configuration as the first reference seat 64, the same components are denoted by the same reference numerals, and detailed description thereof will be omitted.

The second main body portion 88 includes a drain discharge hole 90. The drain discharge hole 90 penetrates through the second main body portion 88. The drain discharge hole 90 opens on a back surface (an end surface) 881 of the second main body portion 88. The drain discharge hole 90 is disposed below the through hole 74. The drain discharge hole 90 communicates with the drain passage 62 of the jig main body 54. Consequently, a liquid (a coolant) stored in the drain tank 126 of the drain discharge mechanism 60, which will be described later, flows to the drain discharge hole 90 through the drain passage 62 and is discharged to the exterior.

The switching valve 68 can switch the flow state of air in the through hole 74. The switching valve 68 is accommodated in the concave portion 78 of the jig main body 54. A portion of the switching valve 68 is accommodated and retained in the insertion portion 72 of each of the first and second reference seats 64 and 66. The switching valve 68 faces the first and second reference seats 64 and 66.

The switching valve 68 includes a holder 92, a rod 94, the piston (a valve element) 96, and a spring (a biasing member) 98.

The holder 92 includes a flange portion 100 and a tubular portion 102. The flange portion 100 has a disk shape. The flange portion 100 comes into contact with the bottom part of the concave portion 78. The tubular portion 102 extends from the center of the flange portion 100 toward the first and second reference seats 64 and 66. The tubular portion 102 is inserted into the valve accommodation portion 86. A communication passage 104 is provided inside the tubular portion 102. The communication passage 104 extends along the axial direction of the tubular portion 102. The communication passage 104 and the air flow path 82 of the jig main body 54 communicate with each other through a plurality of hole portions 106 that open on the flange portion 100. The rod 94 is disposed inside the tubular portion 102.

The rod 94 is a shaft body having a predetermined length in the axial direction. The rod 94 is disposed at the axial center of the holder 92. One end of the rod 94 along the axial direction is fixed to the flange portion 100. The other end of the rod 94 along the axial direction is inserted into the valve accommodation portion 86. The rod 94 includes a shaft portion 95, a valve portion 108, and a communication portion 110. The shaft portion 95 extends from one end to the vicinity of the other end of the rod 94 along the axial direction. The valve portion 108 has substantially the same diameter as one end of the shaft portion 95.

The valve portion 108 is disposed at the other end of the shaft portion 95 in the axial direction. The valve portion 108 can close a port 116 of the piston 96, which will be described later. The outer circumferential part of the valve portion 108 includes an inclined surface 109. The inclined surface 109 increases in diameter from the valve portion 108 toward the shaft portion 95. The communication portion 110 is disposed in the shaft portion 95. The communication portion 110 is disposed closer to the one end of the rod 94 than the valve portion 108 is. The communication portion 110 has a smaller diameter than the valve portion 108.

The piston 96 is movably accommodated in the valve accommodation portion 86. The cross-sectional shape of the piston 96 is a U-shape. The piston 96 includes an end wall portion 112 and a circumferential wall portion 114. The end wall portion 112 is flat and orthogonal to the axial line of the piston 96. The end wall portion 112 is disposed in a direction toward the first and second reference seats 64 and 66. The end wall portion 112 faces the connection port 84 of the through hole 74. The port 116 opens at the center of the end wall portion 112. The port 116 penetrates through the end wall portion 112. The communication portion 110 of the rod 94 is inserted into the port 116. The valve portion 108 of the rod 94 is disposed at a position closer to the first and second reference seats 64 and 66 than the end wall portion 112 (the port 116) is.

The circumferential wall portion 114 has a cylindrical shape. The circumferential wall portion 114 extends from the outer edge of the end wall portion 112 toward the flange portion 100. The circumferential wall portion 114 is disposed on the outer circumference of the tubular portion 102 of the holder 92. The circumferential wall portion 114 is in sliding contact with the sealing ring 87 of each of the first and second reference seats 64 and 66. An annular space 97 is provided radially outward of the circumferential wall portion 114. The annular space 97 and the discharge passage 76 communicate with each other.

The spring 98 is accommodated in the tubular portion 102. The spring 98 is disposed between the flange portion 100 and the end wall portion 112 of the piston 96. The spring 98 biases the piston 96 in the axial direction toward a direction away from the holder 92. The spring 98 presses the piston 96 toward the first and second reference seats 64 and 66. When the piston 96 is moved in the direction away from the holder 92 by the resilient force of the spring 98, the port 116 is brought into contact with the valve portion 108 of the rod 94. A valve closed state in which the port 116 is closed by the valve portion 108 is established (refer to FIG. 5 and FIG. 6).

As shown in FIG. 1 to FIG. 3 and FIG. 7, the first bearing portion 56 is disposed at the upper end of the jig main body 54. The second bearing portion 58 is disposed at the lower end of the jig main body 54. The first and second bearing portions 56 and 58 each project out in a direction orthogonal to the extending direction of the jig main body 54. The first and second bearing portions 56 and 58 each extend in a direction away from the main body frame 14. The first bearing portion 56 and the second bearing portion 58 face each other in the upper/lower direction.

The first bearing portion 56 includes first support holes 118. The first support holes 118 penetrate in the upper/lower direction. When the tools 24 are lowered together with the tool head 22, first bearings 120 for supporting the tools 24 are inserted into the first support holes 118. The first bearings 120 are retained by the first support holes 118 of the first bearing portion 56.

The second bearing portion 58 includes second support holes 122. The second bearings 124 are accommodated in the second support holes 122. When the tools 24 are lowered together with the tool head 22, the lower ends of the tools 24 are inserted into the second support holes 122. The lower ends of the tools 24 are rotatably supported by the second bearings 124. The interior of the second bearing portion 58 communicates with the air flow path 82.

The drain discharge mechanism 60 is disposed in the middle of the air flow path 82. The drain discharge mechanism 60 removes a liquid (a coolant) contained in the air flowing through the air flow path 82. The drain discharge mechanism 60 includes the drain tank 126, first and second tubes 128 and 130, and a drain tube 132. The drain tank 126 is a hollow in which a drain chamber is included.

The drain tank 126 is attached to a side portion of the jig main body 54 in the widthwise direction (refer to FIG. 3 and FIG. 7). The bottom part of the drain tank 126 includes a drain hole (a discharge hole) 134. The drain hole 134 communicates with the exterior of the drain tank 126. The drain tube 132 is connected to the drain hole 134. The liquid accumulated in the bottom part of the drain tank 126 is discharged from the drain hole 134 to the drain tube 132. The drain tube 132 is connected to the drain passage 62 of the jig main body 54.

The first tube 128 connects the air flow path 82 downstream of the switching valve 68, and the drain tank 126. The first tube 128 is connected to an upper part of the drain tank 126. Consequently, the air flowing through the air flow path 82 is supplied into the drain tank 126 through the first tube 128.

The second tube 130 connects the drain tank 126 and the air flow path 82 communicating with the second bearings 124. The second tube 130 is connected to the upper part of the drain tank 126. The second tube 130 is connected to the air flow path 82 at a position downstream of the first tube 128. As a result, the air introduced into the drain tank 126 is returned to the air flow path 82 through the second tube 130. The drain discharge mechanism 60 is disposed so as to bypass a portion of the air flow path 82.

When the air flowing through the air flow path 82 passes through the drain tank 126, the liquid contained in the air drops downward by gravity inside the drain tank 126. The liquid is stored in the bottom part of the drain tank 126.

The support block 28 is accommodated in the accommodation space 36 of the main body frame 14 (refer to FIG. 1). The support block 28 is exposed to the exterior of the main body frame 14 through the opening of the accommodation space 36. When the four jigs 26 are rotated together with the support carriers 52, one jig 26 of the four jigs 26 faces the support block 28. The one jig 26 that faces the support block 28 is capable of being retained by the support block 28. The shape of the support block 28 corresponds to the jig main body 54 of the jig 26. The support block 28 includes a front surface 136. The front surface 136 is a surface facing the jig 26. The front surface 136 includes four connecting portions 138.

The connecting portions 138 protrude from the front surface 136 toward the jig 26. The cross-sectional shape of the connecting portions 138 is circular when viewed from the axial direction of the connecting portions 138. The four connecting portions 138 are disposed at positions corresponding to the first and second reference seats 64 and 66 of the jig 26. Specifically, on the front surface 136 of the support block 28, two connecting portions 138 are disposed in the vicinity of the upper end of the support block 28. Two connecting portions 138 are disposed in the vicinity of the lower end of the support block 28. The connecting portions 138 can be inserted into the connection ports 84. The outer diameter of the connecting portions 138 corresponds to the inner diameter of the connection ports 84.

An air supply flow path (a first air flow path) 140 is provided inside each of the connecting portions 138. The air supply flow path 140 opens on an end part of the connecting portion 138. The air supply flow path 140 is connected to an air supply source (not shown). Compressed air is supplied from the air supply source to the air supply flow path 140.

When the support block 28 and the jig 26 face each other, the four connecting portions 138 face the first and second reference seats 64 and 66. When the support block 28 and the jig 26 are connected to each other, the four connecting portions 138 are inserted into the connection ports 84 of the first and second reference seats 64 and 66, respectively. The front surface 136 of the support block 28 comes into contact with the back surfaces 701 of the first reference seats 64 and the back surfaces 881 of the second reference seats 66.

Consequently, by the front surface 136 of the support block 28 coming into contact with the back surfaces 701 of the first reference seats 64 and the back surfaces 881 of the second reference seats 66, the support block 28 and the jig 26 are positioned at predetermined positions. The air supply flow paths 140 of the support block 28 communicate with the connection ports 84 of the first and second reference seats 64 and 66 of the jig 26. Air is supplied from the air supply flow paths 140 to the connection ports 84.

When the support block 28 comes into contact with each of the first and second reference seats 64 and 66, the piston 96 is pressed toward the holder 92 by a distal end surface 139 of each of the connecting portions 138. The distal end surface 139 is has an annular shape. The entire circumference of the distal end surface 139 can be brought into contact with the piston 96. The end wall portion 112 is separated from the valve portion 108 by the movement of the piston 96 toward the holder 92. The valve portion 108 is separated from the port 116, and the port 116 is opened. Consequently, the air supply flow path 140 of the connecting portion 138 and the communication passage 104 of the holder 92 communicate with each other.

The support block 28 and the jig 26 are provided with an air supply mechanism 141. The air supply mechanism 141 includes the air supply flow paths 140 of the support block 28, the air flow path 82 of the jig 26, and the switching valves 68 disposed in the opening portions of the jig 26. When the support block 28 and the jig 26 are connected to each other, the switching valves 68 are opened by the connecting portions 138, and air can be supplied from the air supply flow paths 140 to the air flow path 82.

As shown in FIG. 1, the transport mechanism 30 is disposed on the second base 34 of the foundation 12. The transport mechanism 30 faces the machining station 16. The transport mechanism 30 includes a movable platform 142, a cylinder 144, a workpiece retaining body 146, a pallet 148, and a pallet retaining portion 150.

The movable platform 142 is disposed horizontally on the upper part of the second base 34. The movable platform 142 is capable of moving along the second base 34 in a direction toward or away from the main body frame 14. The cylinder 144 biases the movable platform 142 in the direction toward or away from the main body frame 14. The workpiece retaining body 146 is retained by the movable platform 142. The workpiece retaining body 146 extends along the direction of movement of the movable platform 142. The pallet retaining portion 150 is attached to an end part of the workpiece retaining body 146.

The pallet retaining portion 150 faces the machining station 16 and the main body frame 14. The pallet retaining portion 150 is a plate-shaped body that is orthogonal to the axial direction of the workpiece retaining body 146. The pallet retaining portion 150 is orthogonal to the direction of movement of the movable platform 142. The pallet retaining portion 150 is capable of retaining the workpiece W via the pallet 148.

By causing the movable platform 142 to be moved by the cylinder 144, the workpiece W that is retained on the pallet 148 can be brought closer in proximity to or separated away from the machining station 16.

Next, the operation of the cutting machine 10 will be described.

First, at a position in which the movable platform 142 of the transport mechanism 30 is separated away from the main body frame 14, the workpiece W is retained on the pallet 148. The cylinder 144 is driven to cause the movable platform 142 to be moved toward the main body frame 14 together with the workpiece retaining body 146. Consequently, the workpiece W reaches the machining station 16, and the workpiece W is retained by the jig 26. By rotating the support carriers 52, the workpieces W are retained respectively by the four jigs 26.

Next, the jig 26 is disposed at a position facing the support block 28, and the jig 26 is pulled toward the support block 28. The front surface 136 of the support block 28 is brought into contact with the back surfaces 701 of the first reference seats 64 and the back surfaces 881 of the second reference seats 66. As a result, the jig 26 and the support block 28 are positioned at predetermined positions. The connecting portions 138 of the support block 28 are inserted into the connection ports 84 of the first and second reference seats 64 and 66. Consequently, the jig 26 is retained by the support block 28.

When the connecting portions 138 are inserted into the connection ports 84, the piston 96 of the switching valve 68 is pressed by the distal end surface 139 of each of the connecting portions 138 in a direction away from the support block 28. The distal end surface 139 and the end wall portion 112 of the piston 96 come into contact with each other over the entire circumference. In accordance with the pressing by the connecting portion 138, the piston 96 moves toward the holder 92 against the resilient force of the spring 98.

By the movement of the piston 96 in the direction away from the support block 28, the port 116 is separated from the valve portion 108 and faces the communication portion 110. A gap is formed between the inner circumferential surface of the port 116 and the communication portion 110. The air supply flow path 140 of the support block 28 and the communication passage 104 of the switching valve 68 communicate with each other through the gap. The air supplied from the air supply source (not shown) to the air supply flow path 140 is supplied to the air flow path 82 of the jig 26 through the port 116, the communication passage 104, and the plurality of hole portions 106.

The air flowing through the air flow path 82 is introduced into the drain tank 126 through the first tube 128. Inside the drain tank 126, the coolant contained in the air drops downward by gravity in the drain tank 126. This removes the coolant from the air. The air from which the coolant has been removed is led out from the drain tank 126 to the second tube 130 and the air flow path 82. The air is supplied from the air flow path 82 to the vicinity of the second bearings 124 of the second bearing portion 58. As a result, the second bearings 124 are suitably cooled by the air from which the coolant has been removed.

The coolant accumulated in the drain tank 126 flows from the drain hole 134 to the drain passage 62 of the jig main body 54 through the drain tube 132. The coolant flows along the drain passage 62 to the drain discharge holes 90 of the second reference seats 66. The front surface 136 of the support block 28 is in contact with the back surfaces 881 of the second reference seats 66. The drain discharge holes 90 are covered by the front surface 136 of the support block 28. Therefore, the coolant remains in the drain passage 62.

Next, by driving the lifting motor 44 of the feed mechanism 20, the drive mechanism 18 and the tool head 22 are lowered toward the workpiece W. Consequently, the tools 24 are lowered together with the tool head 22. The tools 24 are inserted into the machined holes H of the workpiece W. The lower ends of the tools 24 are inserted into the second bearings 124 of the second bearing portion 58. The first bearings 120 are inserted into and supported by the first support holes 118 of the first bearing portion 56. Consequently, the upper ends and the lower ends of the tools 24 are rotatably supported by the first and second bearing portions 56 and 58.

The workpiece W is moved slightly in the horizontal direction by the transport mechanism 30, and the axial lines of the machined holes H of the workpiece W and the axial lines of the tools 24 are aligned. The drive motor 42 is driven, and the tools 24 are further lowered while being rotated. Consequently, the inner circumferential surfaces of the machined holes H are cut by the bits 50 which rotate together with the tools 24. The inner circumferential surfaces of the machined holes H in the workpiece W are machined to a desired inner circumferential diameter.

At this time, the upper ends and the lower ends of the tools 24 are supported by the first and second bearings 120 and 124. When the second bearings 124 rotate together with the tools 24, there is a concern that the coolant scattered in the machining station 16 enters the interior of the second bearings 124 through gaps between rotating portions and non-rotating portions of the second bearings 124. At this time, the air supplied through the air flow path 82 prevents the coolant from entering the second bearings 124. In addition, heat is generated in the vicinity of the second bearings 124 in accordance with the rotation of the second bearings 124. The vicinity of the second bearings 124 is suitably cooled by the air supplied through the air flow path 82.

When machining is to be carried out on machined holes H of another workpiece W that is retained by the support carriers 52, at first, the connection between the jig 26 that retains the workpiece W on which machining has been completed and the support block 28 is released. By separating the jig 26 from the support block 28, the first and second reference seats 64 and 66 of the jig 26 are separated from the front surface 136 of the support block 28. As a result, the drain discharge holes 90 of the second reference seats 66 are opened. The coolant remaining in the drain passage 62 is discharged from the drain discharge holes 90 to the exterior of the jig 26.

By the jig 26 being separated from the support block 28, the pressing of the piston 96 of the switching valve 68 by each of the connecting portions 138 is released. The piston 96 is moved in the direction away from the holder 92 by the resilient force of the spring 98. The port 116 moves toward the valve portion 108 in accordance with the movement of the piston 96. A valve closed state in which the port 116 is closed by the valve portion 108 is established. As a result, the upstream end of the air flow path 82 is closed by the switching valve 68.

The support carriers 52 are rotated to cause the jig 26 corresponding to the type and specification of the next workpiece W to face the support block 28. Then, the jig 26 is pulled toward the support block 28, and the front surface 136 of the support block 28 is brought into contact with the back surfaces 701 of the first reference seats 64 and the back surfaces 881 of the second reference seats 66. After the jig 26 and the support block 28 are positioned at predetermined positions, the next workpiece W is transported by the transport mechanism 30 into the jig 26 that has been positioned. The tool head 22 is lowered, and machining of the machined holes H of the workpiece W is carried out by the tools 24. At this time, while the machined holes H are being machined, the coolant is sprayed mainly to the machined portion of the workpiece W, and the machined portion is cooled.

Further, when machining of the holes of the workpiece W is performed by the cutting machine 10, chips are generated in accordance with the cutting of the machined holes H by the bits 50. Therefore, after the machining of the holes of the workpiece W is completed, the coolant (the liquid) is sprayed to the vicinity of the jig 26 and the support block 28 to clean the jig 26 and the support block 28. During the machining of the holes by the bits 50, the coolant is continuously sprayed mainly to the machined portion of the workpiece W. The coolant adheres to the surfaces of the jig 26 and the support block 28.

When the jigs 26 and the support block 28 are connected in order to sequentially machine a plurality of the workpieces W, the coolant adhering to the surface of the jigs 26 or the support block 28 may enter the interior of the connection port 84.

Figure 5:
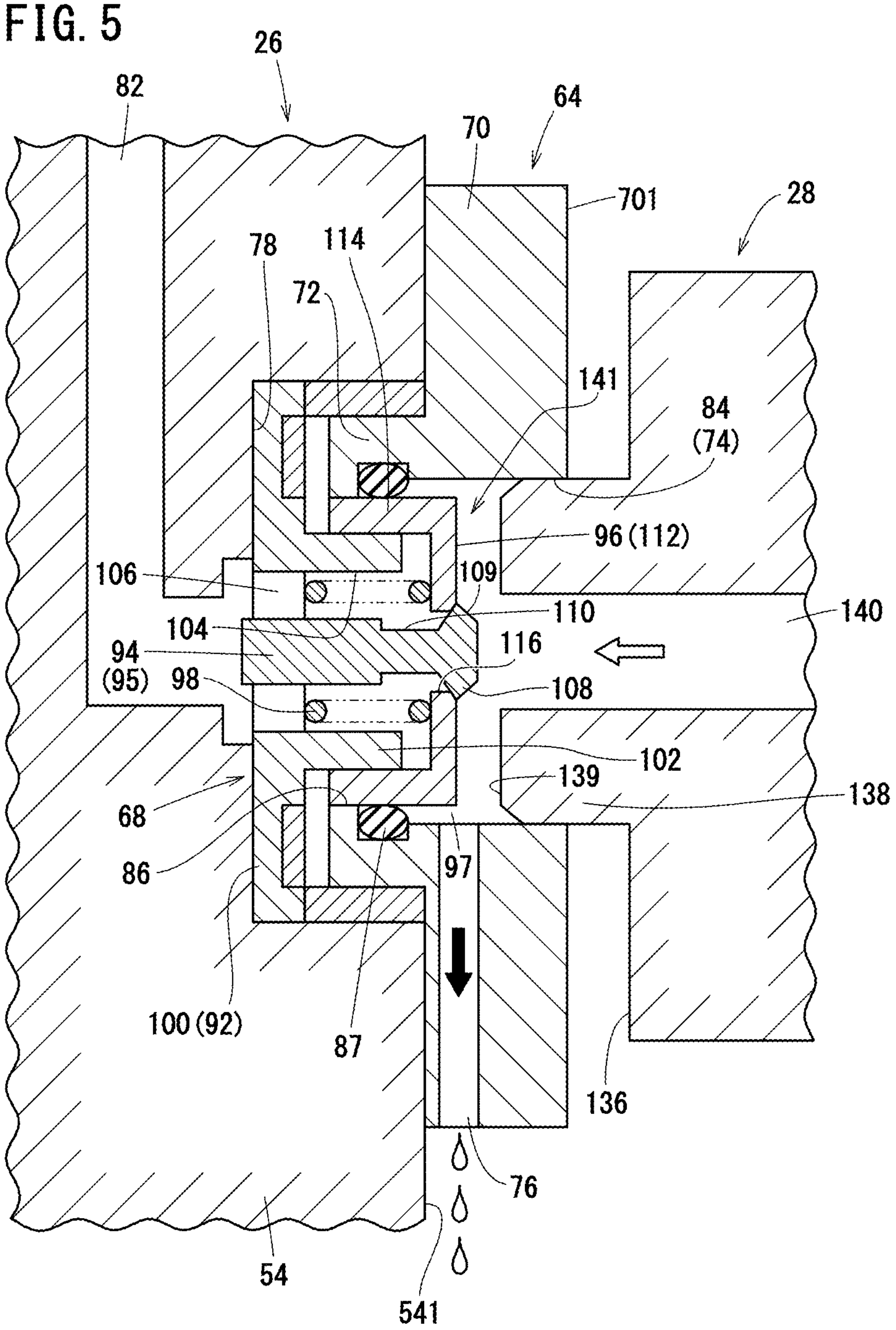
FIG. 5 is an enlarged cross-sectional view showing a state in the course of connection between the jig and a support block at the time of starting the connection.

In this case, as shown in FIG. 5, the distal end of the connecting portion 138 of the support block 28 is inserted into the connection port 84 into which the coolant has entered. At this time, the distal end surface 139 of the connecting portion 138 is not in contact with the end wall portion 112 of the piston 96 of the switching valve 68 disposed in each of the first reference seats 64 and each of the second reference seats 66 of the jig 26. The switching valve 68 is not disposed in the air supply flow path 140 of the connecting portion 138. Therefore, air is supplied to the air supply flow path 140 in advance.

Therefore, air is supplied to the connection port 84, and the coolant in the connection port 84 is pushed out to the discharge passage 76 by the flow of air. In a case where the coolant adheres to the valve portion 108 and the end wall portion 112 of the switching valve 68, the coolant moves radially outward in a space formed between the distal end surface 139 of the connecting portion 138 and the end wall portion 112 of the piston 96, by the air sprayed from the opening portion at the distal end of the connecting portion 138 in the support block 28. The coolant flows into the discharge passage 76 via the space (the annular space 97) around the piston 96.

As a result, the coolant that has entered the connection port 84 is suitably discharged to the exterior. The connecting portion 138 is not in contact with the piston 96. Therefore, the piston 96 is not pressed toward the holder 92 by the connecting portion 138. Since the port 116 is closed by the valve portion 108, the air and the coolant do not flow into the air flow path 82 of the jig 26.

Figure 6:
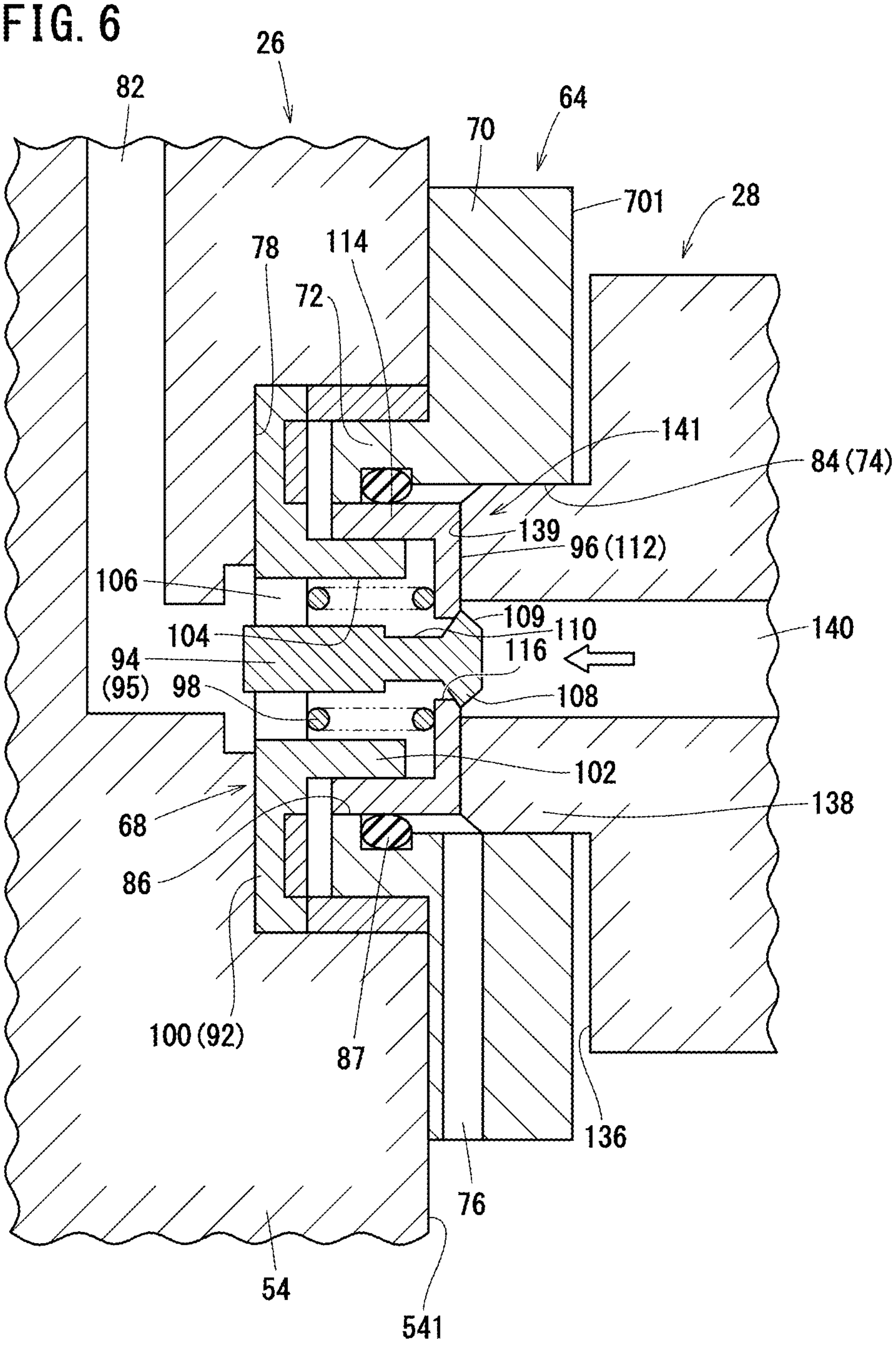
FIG. 6 is a cross-sectional view showing a state in the course of connection of FIG. 5, in which the jig and the support block are further brought close to each other.

As shown in FIG. 6, the jig 26 is pulled toward the support block 28, the connection port 84 moves along the connecting portion 138, and the end wall portion 112 of the piston 96 and the connecting portion 138 come into contact with each other. Consequently, the communication between the discharge passage 76 and the connection port 84 is blocked by the connecting portion 138.

As shown in FIG. 3, when the support block 28 and the jig 26 are connected to each other, the piston 96 is pressed toward the holder 92 by the connecting portion 138 against the resilient force of the spring 98. The port 116 faces the communication portion 110 of the rod 94, whereby the air supply flow path 140 of the support block 28 and the air flow path 82 of the jig 26 communicate with each other through the communication passage 104 (the switching valve). At this time, the communication between the discharge passage 76 and the connection port 84 is blocked by the connecting portion 138. Therefore, when air flows from the air supply flow path 140 to the air flow path 82, the air does not flow out to the exterior through the discharge passage 76.

Even when the chips enter the interior of the connection port 84, the chips can be discharged from the discharge passage 76 to the exterior by using the air supplied to the connection port 84. Thus, when the switching valve 68 is opened, the chips are prevented from moving toward the second bearing 124 together with the air through the air flow path 82.

As described above, in the embodiment of the present invention, the support block 28 retained by the main body frame 14 is provided, and the support block 28 retains, in an attachable and detachable manner, the jig 26 that retains the workpiece W. The connecting portions 138 of the support block 28 are connected to the first and second reference seats 64 and 66 of the jig 26. The connecting portions 138 are connected to the first and second reference seats 64 and 66, whereby the support block 28 and the jig 26 are positioned relative to each other. The air supply mechanism 141 can supply air from the support block 28 to the interior of the jig 26 when the support block 28 and the jig 26 are connected to each other. The air supply mechanism 141 includes the air supply flow paths 140 disposed in the support block 28, the air flow path 82 disposed in the jig 26, and the switching valves 68 disposed in the air flow path 82.

When the jig 26 and the support block 28 are separated from each other, the coolant or the chips adhering to the jig 26 and the support block 28 may enter the interior of the connection port 84. In a process of connecting each of the connecting portions 138 of the support block 28 and each of the first reference seats 64 of the jig 26, before the connecting portion 138 is inserted into the connection port 84 and the switching valve 68 is pressed by the distal end surface 139 of the connecting portion 138, the annular space 97 surrounded by the first reference seat 64, the connecting portion 138, and the switching valve 68 communicates with the discharge passage 76. It should be noted that the discharge passage 76 may be provided in the support block 28 instead of being provided in the first reference seat 64.

Consequently, the coolant or the chips that have entered the connection port 84 can be swept away toward the discharge passage 76 by the air supplied to the air supply flow path 140. As a result, the coolant or the chips that have entered the connection port 84 can be discharged to the exterior from the discharge passage 76. Further, when the coolant is retained in the vicinity of the contact portion between each of the first and second reference seats 64 and 66 of the jig 26 and each of the connecting portions 138 of the support block 28, the coolant can be swept away toward the discharge passage 76 by the air supplied to the air supply flow path 140.

Therefore, the coolant or the chips can be prevented from entering the air flow path 82 of the jig 26. Accordingly, the coolant or the chips can be reliably prevented from reaching the second bearings 124 of the second bearing portion 58 through the air flow path 82.

The switching valve 68 includes the rod 94 including the valve portion 108, the piston 96 including the port 116 and movable in the axial direction of the rod 94, and the spring 98 for biasing the piston 96 in a direction in which the port 116 is closed by the valve portion 108. The piston 96 includes the end wall portion 112 surrounding the port 116. The connecting portion 138 of the support block 28 includes the distal end surface 139 surrounding the air supply flow path 140. The piston 96 is pushed by the distal end surface 139 of the connecting portion 138 and moved, whereby the switching valve 68 is opened. When the connecting portion 138 pushes the piston 96, the entire circumference of the distal end surface 139 of the connecting portion 138 comes into contact with the end wall portion 112 of the piston 96. Consequently, when the switching valve 68 is opened, the distal end surface 139 of the connecting portion 138 and the end wall portion 112 of the piston 96 are in contact with each other over the entire circumference. Therefore, air does not leak from between the distal end surface 139 and the end wall portion 112. As a result, when the switching valve 68 is opened, air can be caused to reliably flow from the air supply flow path 140 to the air flow path 82.

When the connecting portion 138 of the support block 28 is connected to the first reference seat 64 of the jig 26, the valve portion 108 of the rod 94 of the switching valve 68 is inserted into the air supply flow path 140 of the connecting portion 138. Therefore, when the support block 28 and the jig 26 are connected to each other, contact between the valve portion 108 and the connecting portion 138 can be prevented.

The rod 94 of the switching valve 68 includes the shaft portion 95 disposed inside the piston 96, and the valve portion 108 provided at the other end of the shaft portion 95 in the axial direction. The outer circumferential part of the valve portion 108 includes the inclined surface 109 whose diameter increases from the valve portion 108 toward the shaft portion 95. Consequently, when the switching valve 68 is closed as shown in FIG. 5, air can be guided radially outward of the rod 94 along the inclined surface 109. As a result, the coolant can be pushed out to the discharge passage 76 by the air guided radially outward.

The first reference seats 64 are each an annular member including the connection port 84 surrounding the switching valve 68, and the upper end of the discharge passage 76 opens in the connection port 84 of the first reference seat 64. As a result, when the connecting portion 138 is connected to the connection port 84, the coolant can be discharged by being swept away toward the discharge passage 76 by the air supplied to the connection port 84.

The lower end of the discharge passage 76 opens on the outer circumferential part of the first main body portion 70 of the first reference seat 64. Therefore, the coolant can be discharged to the exterior of the first reference seat 64 through the discharge passage 76.

The annular space 97 communicating with the discharge passage 76 is provided between the connection port 84 of the first reference seat 64 and the circumferential wall portion 114 of the switching valve 68. Consequently, the coolant that has entered the annular space 97 can be suitably discharged through the discharge passage 76.

The air flow path 82 of the jig 26 is provided with the drain tank 126, and the lower end of the drain tank 126 includes the drain hole 134 for discharging the coolant present therein. Consequently, the coolant contained in the air flowing through the air flow path 82 can be reliably removed. The coolant accumulated in the drain tank 126 can be discharged to the exterior through the drain hole 134.

The second reference seats 66 include the drain discharge holes 90. The drain discharge holes 90 are connected to the drain passage 62 disposed inside the jig 26. When the connecting portions 138 of the support block 28 and the second reference seats 66 of the jig 26 are connected to each other, the drain discharge holes 90 are closed by the connecting portions 138. When the connecting portions 138 are not connected to the second reference seats 66, the drain discharge holes 90 are opened so that the coolant can be discharged from the drain passage 62. As a result, when the support block 28 and the jig 26 are not connected to each other, the coolant in the drain tank 126 can be discharged to the exterior from the drain discharge holes 90 through the drain passage 62. At the timing when the jig 26 and the support block 28 are separated from each other, the coolant in the drain tank 126 can be forcibly discharged to the exterior by using the pressing force due to the residual pressure of the compressed air.

The above-described embodiment can be summarized as follows.

The above-described embodiment is characterized by the cutting machine (10) including: the machine main body (31) including the drive mechanism (18) configured to rotationally drive the tool (24) that is configured to perform cutting machining on the workpiece (W); and the jig (26) configured to be attachable to and detachable from the machine main body and configured to retain the workpiece, wherein the machine main body includes: the main body frame (14) on which the drive mechanism is disposed; the support block (28) that is configured to support the jig in an attachable and detachable manner, includes the connecting portion (138) to be connected to the connected portion (64, 66) of the jig, and is disposed on the main body frame; and the air supply mechanism (141) configured to supply air from the support block to the interior of the jig, the air supply mechanism includes: the first air flow path (140) that is disposed in the support block, opens at the connecting portion, and is supplied with air from the air supply source; the second air flow path (82) that is disposed in the jig and opens at the connected portion; and the switching valve (68) disposed in the second air flow path, the switching valve being disposed in the jig and configured to, when the connecting portion and the connected portion are connected to each other, allow the first air flow path and the second air flow path to communicate with each other by being pressed by the connecting portion and thereby opened, the discharge passage (76) is disposed in at least one of the connecting portion or the connected portion, and before the switching valve is opened in a process of an operation of connecting the connected portion and the connecting portion, the discharge passage communicates with the space surrounded by the connected portion, the connecting portion, and the switching valve.

The switching valve includes the rod (94) including the valve portion (108), the piston (96) including the port (116) and movable in the axial direction of the rod, and the biasing member (98) configured to bias the piston in a direction in which the port is closed by the valve portion, the piston includes the end wall portion (112) surrounding the port, the connecting portion includes the distal end surface (139) surrounding the first air flow path, the switching valve is opened by the piston being pushed by the distal end surface of the connecting portion and moved, and when the connecting portion pushes the piston, the entire circumference of the distal end surface of the connecting portion comes into contact with the end wall portion of the piston.

When the connecting portion is connected to the connected portion, the valve portion of the rod is inserted into the first air flow path.

The rod includes: the shaft portion (95) disposed inside the piston; and the valve portion provided at one end of the shaft portion, and the outer circumferential part of the valve portion includes the inclined surface (109) whose diameter increases in a direction from the valve portion toward the shaft portion.

The connected portion is an annular member including the inner circumferential part surrounding the switching valve, and one end of the discharge passage opens on the inner circumferential part of the connected portion.

The other end of the discharge passage opens on the outer circumferential part of the connected portion.

The annular space (97) communicating with the discharge passage is formed between the inner circumferential part of the connected portion and the outer circumferential part of the switching valve.

The second air flow path includes the drain tank (126) configured to separate the liquid contained in the air flowing through the second air flow path and store the liquid inside the drain tank, and the lower end part of the drain tank includes the discharge hole (134) configured to discharge the liquid inside the drain tank.

The support block includes the second connecting portion, the jig includes the second connected portion to which the second connecting portion is connectable, the discharge hole is connected to the drain passage (62) disposed inside the jig, the downstream end of the drain passage opens at the second connected portion, when the second connecting portion is connected to the second connected portion, the opening is closed by the second connecting portion, and when the second connecting portion is not connected to the second connected portion, the opening is opened in a manner so that the liquid is dischargeable from the drain passage.

The present invention is not limited to the above-described embodiment, and various configurations can be adopted therein without departing from the essence and gist of the present invention. The configuration of the cutting machine 10 is not limited to the vertical type described above, and may be, for example, a horizontal type in which the main body frame extends in the horizontal direction.

REFERENCE SIGNS LIST

10: cutting machine
26: jig
28: support block
31: machine main body
60: drain discharge mechanism
62: drain passage
64: first reference seat
66: second reference seat
68: switching valve
76: discharge passage
82: air flow path
84: connection port
90: drain discharge hole
140: air supply flow path

What is claim is:

1. A cutting machine comprising: a machine main body including a drive mechanism configured to rotationally drive a tool that is configured to perform cutting machining on a workpiece; and a jig configured to be attachable to and detachable from the machine main body and configured to retain the workpiece, wherein the machine main body includes:

a main body frame on which the drive mechanism is disposed;

a support block that is configured to support the jig in an attachable and detachable manner, includes a connecting portion to be connected to a connected portion of the jig, and is disposed on the main body frame; and an air supply mechanism configured to supply air from the support block to an interior of the jig, the air supply mechanism includes:

a first air flow path that is disposed in the support block, opens at the connecting portion, and is supplied with air from an air supply source;

a second air flow path that is disposed in the jig and opens at the connected portion; and a switching valve disposed in the second air flow path, the switching valve being disposed in the jig and configured to, when the connecting portion and the connected portion are connected to each other, allow the first air flow path and the second air flow path to communicate with each other by being pressed by the connecting portion and thereby opened, a discharge passage is disposed in at least one of the connecting portion or the connected portion, and before the switching valve is opened in a process of an operation of connecting the connected portion and the connecting portion, the discharge passage communicates with a space surrounded by the connected portion, the connecting portion, and the switching valve.

2. The cutting machine according to claim 1, wherein the switching valve includes: a rod including a valve portion; a piston including a port and movable in an axial direction of the rod; and a biasing member configured to bias the piston in a direction in which the port is closed by the valve portion, the piston includes an end wall portion surrounding the port, the connecting portion includes a distal end surface surrounding the first air flow path, the switching valve is opened by the piston being pushed by the distal end surface of the connecting portion and moved, and when the connecting portion pushes the piston, an entire circumference of the distal end surface of the connecting portion comes into contact with the end wall portion of the piston.

3. The cutting machine according to claim 2, wherein when the connecting portion is connected to the connected portion, the valve portion of the rod is inserted into the first air flow path.

4. The cutting machine according to claim 3, wherein the rod includes: a shaft portion disposed inside the piston; and the valve portion provided at one end of the shaft portion, and an outer circumferential part of the valve portion includes an inclined surface whose diameter increases in a direction from the valve portion toward the shaft portion.

5. The cutting machine according to claim 1, wherein the connected portion is an annular member including an inner circumferential part surrounding the switching valve, and one end of the discharge passage opens on the inner circumferential part of the connected portion.

6. The cutting machine according to claim 5, wherein another end of the discharge passage opens on an outer circumferential part of the connected portion.

7. The cutting machine according to claim 5, wherein an annular space communicating with the discharge passage is formed between the inner circumferential part of the connected portion and an outer circumferential part of the switching valve.

8. The cutting machine according to claim 1, wherein the second air flow path includes a drain tank configured to separate a liquid contained in the air flowing through the second air flow path and store the liquid inside the drain tank, and a lower end part of the drain tank includes a discharge hole configured to discharge the liquid inside the drain tank.

9. The cutting machine according to claim 8, wherein the support block includes a second connecting portion, the jig includes a second connected portion to which the second connecting portion is connectable, the discharge hole is connected to a drain passage disposed inside the jig, a downstream end of the drain passage opens at the second connected portion, when the second connecting portion is connected to the second connected portion, an opening is closed by the second connecting portion, and when the second connecting portion is not connected to the second connected portion, the opening is opened in a manner so that the liquid is dischargeable from the drain passage.

* * * * *